United States Patent
Muehlpforte et al.

[11] Patent Number: 6,082,902
[45] Date of Patent: *Jul. 4, 2000

[54] BEARING FOR DRIVEN SHAFTS OF WIPER DEVICE

[75] Inventors: Kurt Muehlpforte; Henk Becker; Claus Fleischer, all of Buehl; Tino Boos, Baden-Baden, all of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,261

[22] Filed: Feb. 21, 1997

[30] Foreign Application Priority Data

Mar. 26, 1996 [DE] Germany ............... 196 11 920
Oct. 16, 1996 [DE] Germany ............... 196 42 666

[51] Int. Cl.[7] ........................................ F16C 17/02
[52] U.S. Cl. .................... 384/129; 68/23.7; 244/2; 242/54 R

[58] Field of Search .................. 244/2; 68/23.7; 242/54 R; 384/129

[56] References Cited

U.S. PATENT DOCUMENTS

| | | | |
|---|---|---|---|
| 3,645,474 | 2/1972 | Arbuse | 244/2 |
| 4,395,890 | 8/1983 | Goodlaxson | 68/23.7 |
| 4,406,420 | 9/1983 | Villano | 242/54 R |

FOREIGN PATENT DOCUMENTS

| | | |
|---|---|---|
| 2920899C2 | 1/1981 | Germany . |
| 2 218 622A | 11/1989 | United Kingdom . |
| 2 227 926 | 12/1992 | United Kingdom . |

*Primary Examiner*—Lenard A. Footland
*Attorney, Agent, or Firm*—Michael J. Striker

[57] ABSTRACT

A wiper device has a tubular plate, a tubular element provided in the tubular plate for supporting a driven shaft, a bearing bushing in which the tubular element is introduced, the bearing bushing and the tubular element being fixed with one another in a form-locking manner.

23 Claims, 10 Drawing Sheets

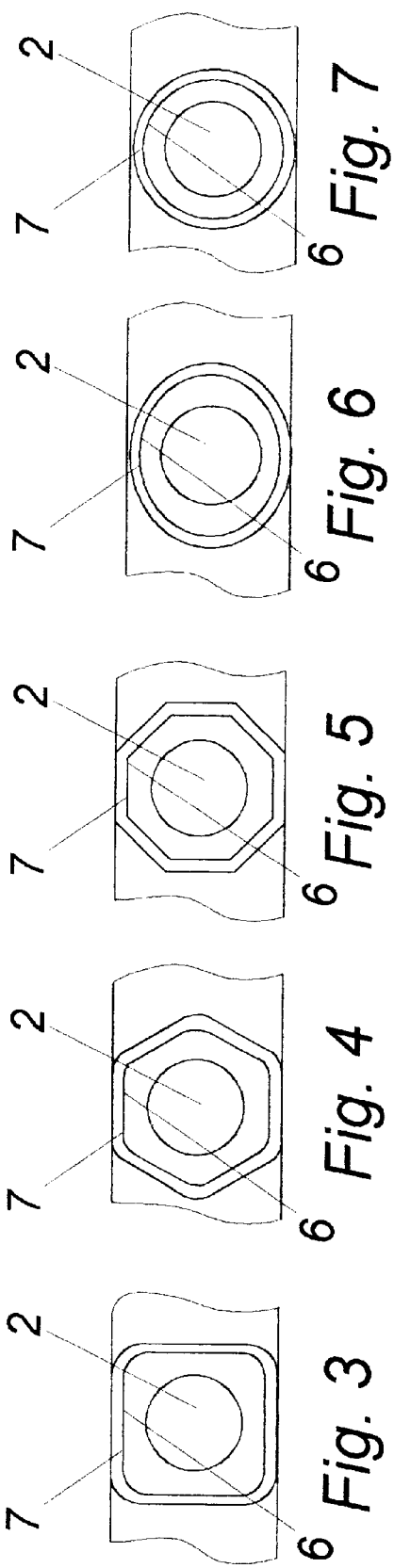

BEARING FOR DRIVEN SHAFTS OF WIPER DEVICE

BACKGROUND OF THE INVENTION

The present invention relates to a bearing for driven shafts of a wiper device.

Wiper devices, in particular for motor vehicles, are mounted on a chassis of the motor vehicle by a tubular plate. A wiper drive and at least one wiper bearing are arranged on the tubular plate. The wiper bearing is formed by a tubular element which is located on the tubular plate and inserted in a bearing bushing. Driven shafts are supported in the bearing bushings and as a rule are driven from the wiper drive through a linkage system. Wipers are arranged on the driven shafts which extend outwardly beyond the chassis.

For properly guiding the driven shafts, they must be axially fixed relative to the tubular plate. Furthermore, the bearing bushings must be held in the tubular plate non rotatably on their periphery, to avoid a relative movement between the bearing bushing and the tubular plate during the operation. This can cause noise and wear.

Such a wiper device as disclosed for example in the German patent DE 29 20 899 C2. In this reference a T-shaped tube is inserted with its vertical part in the tubular plate. It has depressions in which the tubular plate is pressed and thereby the shaped tube is mounted. The transversely extending tubular part is provided at its inner side with a tubular surface which is closed in the longitudinal direction, for a wiper bearing. A special design of the wiper bearing is not disclosed. However, from similar applications it is known that the bearing bushings with the cylindrical outer contour are to be pressed into a receiving opening in a force-transmitting manner. The driven shaft is supported in an axial direction on the vertical tubular part, for example through a safety ring and a bearing ring.

SUMMARY OF THE INVENTION

Accordingly, it is an object of the present invention to provide a bearing for driven shafts of a wiper device, which is a further improvement of the existing bearings.

In keeping with these objects and with others which will become apparent hereinafter, one feature of the present invention resides, briefly stated, in a wiper device with a tubular plate having at least one tubular element provided for supporting drive shafts and introduced into a bearing bushing, wherein in accordance with the new features of present invention, the bearing bushing is fixed relative to the tubular element in a form-locking manner.

When the bearing is designed in accordance with the present invention, it has the advantage that with small, in particular short supporting surfaces the bearing bushing is reliably fixed by form-locking connection in the peripheral direction and/or in the axial direction. When with the thin-walled parts with greater tolerances no reliable and durable press fit can be obtained, the form-locking connection is particularly advantageous.

The driven shaft can be for example supported in the axial direction on the bearing bushing; however, it can also be supported on the tubular element. When the driven shaft is supported on the bearing bushing, a low wear occurs and no additional bearing ring is needed.

With the form-locking connection it is guaranteed that the bearing bushing also with thin-walled parts can be fixed for a long time in the peripheral direction. Preferably, an axial securing is obtained during the assembly. The form-locking connection assembly can additionally have individual force-transmitting components. For example, in some direction a fixation completely by the force-transmitting connection can be obtained or by a combination of the form-locking connection and the force-transmitting direction.

With simple structural means and therefore in cost-favorable manner, the bearing bushing can be fixed with or several collars in one or both axial directions by the form-locking connection. The collar can be formed on the bearing bushing or can be obtained by an additional component connected with the bearing bushing. If a collar has an axial running-on surface extending outwardly in an axial direction, the driven shaft can favorably run over great surface and thereby fixed in this direction axially in a form-locking manner. When the bearing bushing has two collars with axial running-on surfaces, the upper and the lower axial running surfaces can be maintained substantially equal. The identical wear phenomena occur above and below, and the service life above and below is the same.

In accordance with the present invention, the tubular element has an inner contour which deviates from a circular shape and is for example polygonal or non-round, such as ellipsoidal, and also an outer contour corresponding to the bearing bushing, so that a form-locking connection is obtained in the peripheral direction. The correspondence mentioned above means that the outer contour of the bearing bushing exactly corresponds to the inner contour of the tubular element; however also only certain peripheral regions can come in abutment with one another, for example a triangular inner contour can form-locking engage in an octagonal outer contour. A form-locking connection can also obtain by teeth between the bearing bushing and the tubular element. The contact surfaces between the bearing bushing and the tubular element can be basically also round. The fixation and the peripheral direction can be performed by force-transmitting connection, a material connection, a form-locking connection with an additional component or by a combination of these approaches.

When the contour between the bearing bushing and the tubular element is conical in the longitudinal direction, the insertion process at the beginning is facilitated, since a smaller outer diameter of the bearing bushing moves into the greater inner diameter of the tubular element. At the end of the mounting both parts abut with their joining surfaces against one another. The mounting process, in particular with the supporting surfaces having a substantial axial distance and a form-locking connection is thereby facilitated. In addition, a desired tensioning is obtained by the conical contour. In accordance with the present invention, this effect can be also obtained by a stepped contour between the bearing bushing and the tubular element. With a conical or stepped contour and supporting surfaces with an axial distance, a supporting surface which deviates from the circular shape, for example the inner contour of the tubular element and the corresponding out contour of the bearing bushing, suffices for obtaining a form-locking connection.

When the bearing bushing is subdivided in the transverse direction, the bearing bushing can be used with collars formed on both ends. The several parts of the bearing bushing are for example fitted into one another and axially fixed by centering or fitting surfaces. A preferable embodiment includes an arresting or snapping connection, whereby an especially firm and grease-tight sit is obtained.

It is advantageous to use a throughgoing bearing bushing or a subdivided bearing bushing with the parts supported on the partial surfaces when the supporting surfaces have a substantial axial distance, for example in supports with hollow profiles.

When a bearing ring is screwed on the bearing bushing or fitted on it and pressed for example by a force-transmitting connection and thereby a collar is formed, the advantages of a bearing bushing with two formed collars are provided without subdividing the bearing bushing in a transverse direction. This means that for example upper and lower great and identical running-on surfaces can be obtained. Furthermore, it is advantageous to integrate a space for a seal, for example an O-ring in the bearing bushing by extending the bearing ring in an axial direction over the bearing bushing and forming the space for the seal with the projecting part toward the driven shaft. A grease-tight bearing is obtained.

In accordance with an embodiment of the invention, the wall of the bearing bushing is used as a running-on surface. This can be done above and below or only at one side of the bearing bushing. Preferably, a bearing bushing with a substantially greater wall thickness is used here, to provide a maximum great running-on surface and in this way a stable support, with low wear and high service life. When the wall of the bearing bushing is used as a running-on surface, the bearing bushing can be favorably premounted with rings and seals on the shaft structural group and subsequently pressed into the tubular element. Thereby a simple mounting which is especially suitable for the mass production is provided.

With a safety ring or a similar safety element, such as for example with a so-called speednut, the bearing bushing can be fixed axially. The safety ring can be fitted on the bearing bushing or screwed on it, for example by forming it as a swivel nut. Furthermore, it can be formed as a protective cap, whereby the bearing is protected from water, dirt and other components.

Moreover, the structural assembly can be axially fixed in a simple manner by providing on the periphery of the bearing bushing of one or several depressions, for example grooves. The tubular element can be pressed into the depressions, for example by stamping.

Furthermore, the bearing bushinging assembled in a structural group together with the shaft, with seals and disks or individually can be fixed in an axial direction with a spring tongue. It extends over the outer contour of the bearing bushinging and oriented opposite to the mounting direction. During the mounting it is pressed in a free space and engages in the mounting end position and axial abutment surface. The axial abutment surface is formed for example by the outer edge of the tubular element. For fixing a bearing bushing with collar, the spring tongue alone suffices. Preferably, it is obtained with a spring tongue which is injection molded in an injection molding process for the bearing bush.

In accordance with a preferable embodiment of the invention, the tubular element is calibrated with a mandrel before the mounting. The mandrel can be profiled, for example it can be provided with teeth to form a surface for producing a correspondingly designed outer contour of the bearing bushing for a form-locking and force-transmitting connection.

In many cases it is advantageous to complete the form-locking connection by a force-transmitting connection to obtain an optimal gapless assembly. For this purpose it is especially suitable when the bearing bushing on its periphery has a region of deformable material. The material, for example a suitable synthetic plastic material, can be the material for the whole bearing bushing or only as a layer applied in the region of the bearing bushing. Preferably, the outer region has knurls or longitudinal knurls which are limited toward a collar by a ring-shaped depression, for example a ring groove. During the mounting the deformable part adjusts to the joining surfaces and compensates for tolerances. In particular with knurling, the tips of the knurls during insertion in the available intermediate space of the knurls are pressed, whereby after the mounting a relatively greater supporting part is provided with a good force-transmitting connection. The material which insignificantly peels during the mounting is collected in the ring groove under the collar without affecting a precise abutment of the collar. This is especially important since the position under the collar is difficult to control.

Depending on the process with which the tubular element is produced, its outer contour has a smaller tolerance than its inner contour. This is true for example when the tubular element is formed with an inner high pressure process, in which a tubular piece under high pressure is pressed from inside against a tool mold. In such cases the bearing bushing can be centered on an outer periphery of the tubular element. For this purpose a collar of the bearing bushing engages over the tubular element and comes to abutment against the outer periphery of the tubular element. Tolerances and gaps on the inner side are compensated preferably by a deformable region in the bearing bushing, as described above.

A seal prevents in advantageous manner than the grease exits the bearing to guarantee a service life lubrication. For the seal, a structural space is integrated in the bearing bushing, for example in the collar or in the wall of the bearing bushing.

Lubricating grooves or lubricating pockets can be arranged preferably in an axial direction in the bearing bushing. In this way, a sufficient grease quantity is supplied in a simple manner and distributed in the bearing bushinging for lubrication of the driven shaft.

The inventive bearing has great advantages, in particular for tubular plates with hollow profiles and formed tubular elements. However, they also can be used for tubular elements with throughgoing receiving openings In an advantageous manner.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 3–5 are views showing polygonal inner and outer contours of the tubular element and the bearing bushing;

FIG. 6 is a view showing an non-round inner and outer contour of the tubular element and the bearing bushing in accordance with the present invention;

FIG. 7 is a view showing a round inner and outer contour of the tubular element in the bearing bushing in accordance with the present invention;

DESCRIPTION OF PREFERRED EMBODIMENTS

Figure 1:
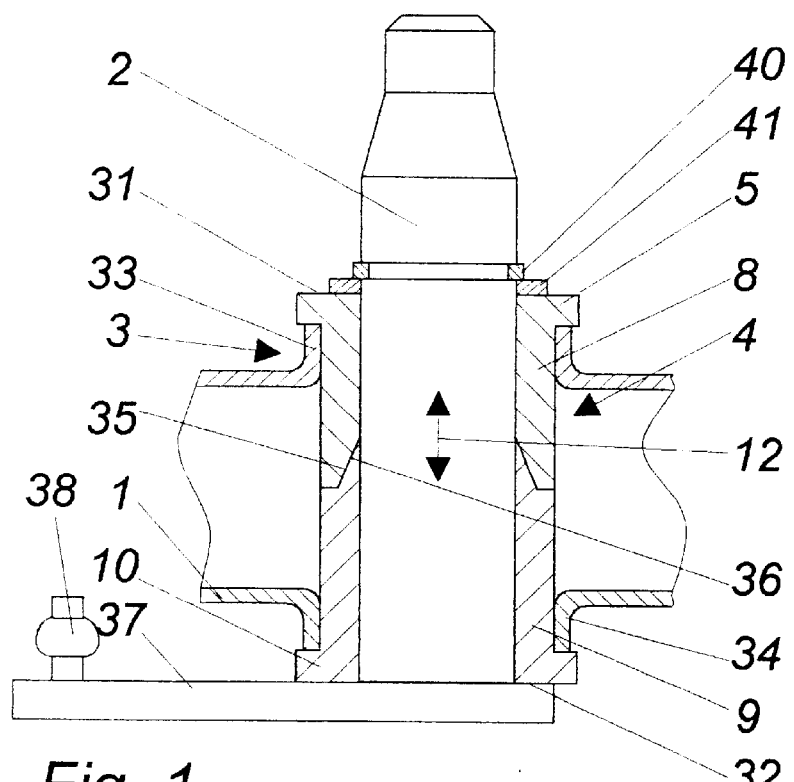
FIG. 1 is a view showing a two-part bearing bushing with fitting surfaces in accordance with the present invention.

FIG. 1 shows a section of a tube member 1 with a hollow profile, on which a tubular element 3 is formed for example by an inner high pressure process. The tubular element 3 is formed by oppositely located, outwardly extending ring-shaped collars 33 and 34. A bearing bushing 4 which is subdivided in a transverse direction in two parts is inserted in the tubular element 3. It can be composed of synthetic plastic or metal. The bearing bushing 4 has a first part 8 and a second part 9. Each of the parts 8 and 9 has an in an axial direction 12 an outwardly projecting collar 5, 10. The collars 5 and 10 are closed outside by axial running-on surfaces 31, 32 and inside form-lockingly with the end sides of the ring-shaped flanges 33, 34. The first part 8 of the bearing bushing 4 is inserted from above and the second part 9 of the bearing bushing 4 is inserted from below into the tubular element 3. The parts 8, 9 are plugged in one another and fixed outwardly by fitting surfaces 35, 36 in the axial direction 12, by providing an over dimensioned fit of a fitting surface 35.

A driven shaft 2 is supporting the bearing bushing 4. It abuts in the axial direction 12 from below upwardly with a web 37 against the running-on surface 32 of the lower collar 10. The driven shaft 2 is driven from a wiper drive through a hinge ball 38 arranged on a web 37.

In the axial direction 12 from above downwardly the driven shaft 2 abuts with the safety ring 40 and a running-on ring 41 against the upper running-on surface 31 of the upper collar 5. A form-locking connection is formed in the axial direction 12 by supporting the driven shaft 2 on the running-on surfaces 31, 32 of the bearing bushing 4 and by supporting it with the inner sides of the collars 5, 10 against the end surfaces of the ring shape flanges 33, 34.

Figure 2:
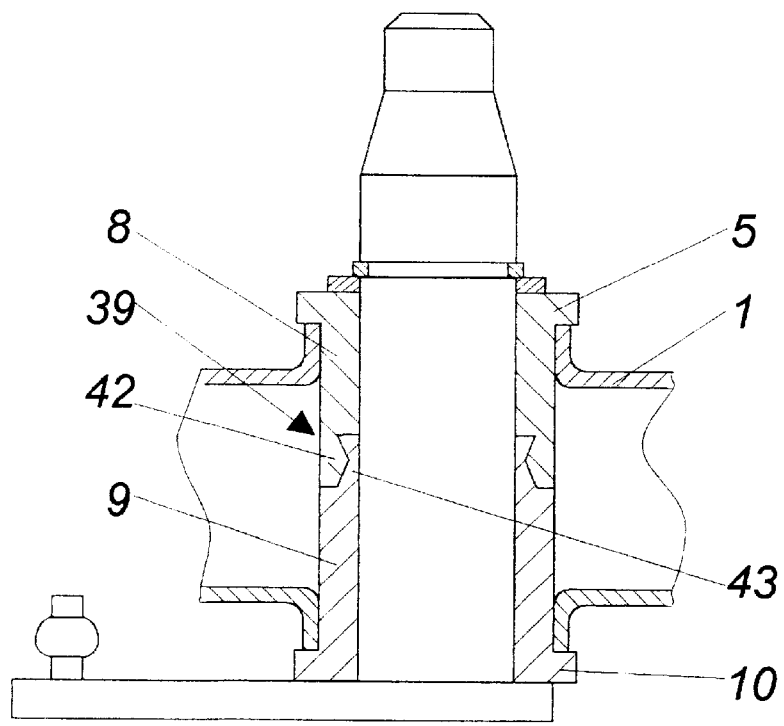
FIG. 2 is a view showing a two-part bearing bushing with an arresting connection.

The axial securing outwardly of the parts 8, 9 in the embodiment of FIG. 2 is provided by an arresting connection 39. The arresting connection 39 includes two ring-shaped webs 42, 43. During insertion of the parts 8, 9 into one another, the webs 42, 43 deviate in a transverse direction, namely one inwardly and another outwardly, and in the end position after the mounting inter engage one another.

In accordance with the invention the bearing bushing 4 is fixed in the peripheral direction by a form-locking connection. In particular, the tubular element 3 has an inner contour 6 which deviates from a circular shape, in particular is formed as a polygonal or non-round inner contour, and the bearing bushing 4 has an outer contour 7 corresponding to this inner contour. FIG. 3 shows for example a rectangular inner and outer contour, FIG. 4 shows a hexagonal inner and outer contour, and FIG. 5 shows an octagonal inner and outer contour 6 and 7 correspondingly. Basically, all polygonal shapes can be utilized. In FIG. 6 a non-round elliptical inner contour 6 of the tubular element 3 and a corresponding outer contour 7 of the bearing bushing 4 are illustrated. Basically, also a round inner contour 6 and outer contour 7 are possible, as shown in FIG. 7. The fixation in the peripheral direction can be then performed by force-transmitting connection, a material connection, by form-locking connection with an additional component or by a combination of these approaches.

Figure 8:
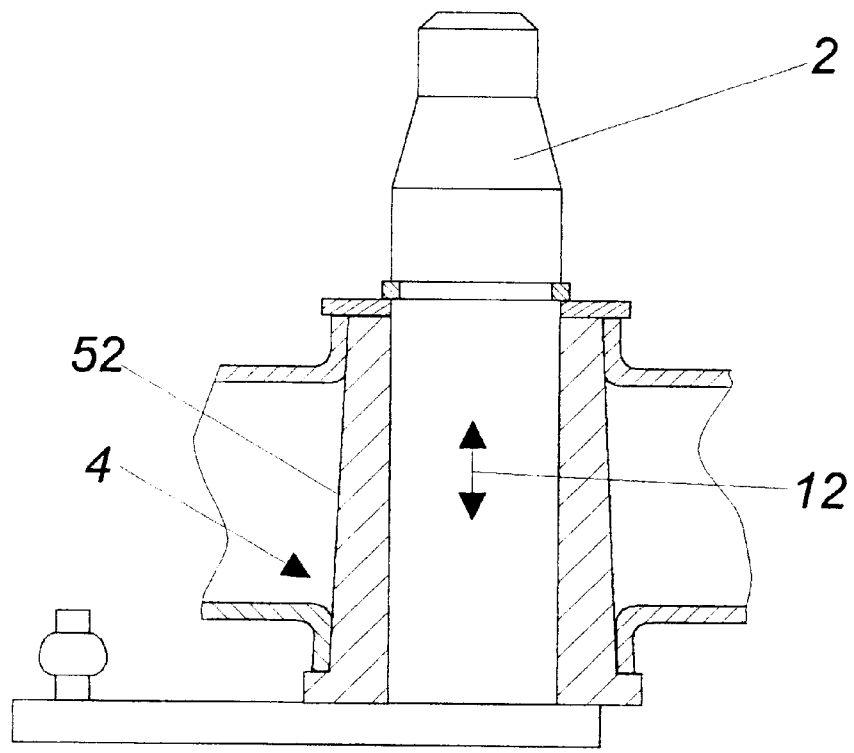
FIG. 8 is a view showing a bearing bushing with a conical contour in accordance with the present invention.
Figure 9:
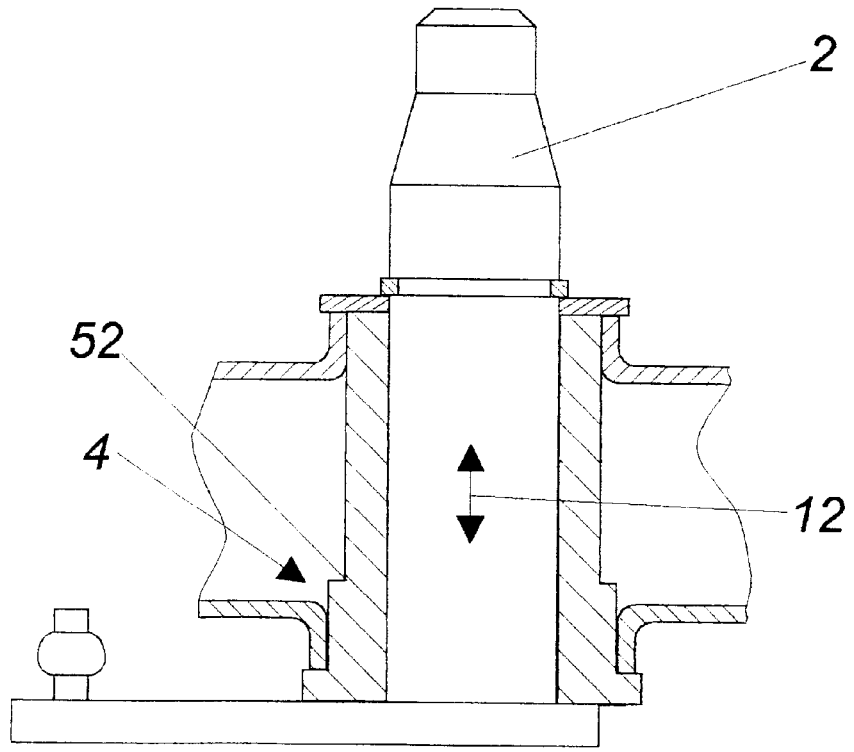
FIG. 9 is a view showing a bearing bushing with a stepped contour in accordance with the present invention.

FIG. 8 shows a bearing bushing 4 and a tubular element 3 which have a conical contour 52 in the axial direction 12. Thereby the insertion process is facilitated, since first the upper smaller outer diameter of the bearing bushing 4 approaches the lower greater inner diameter of the tubular element 3 and only at the end of the mounting process the joining is completed. The same effect is obtained when the contour 52 is stepped in the axial direction 12 as shown in FIG. 9.

Figure 10:
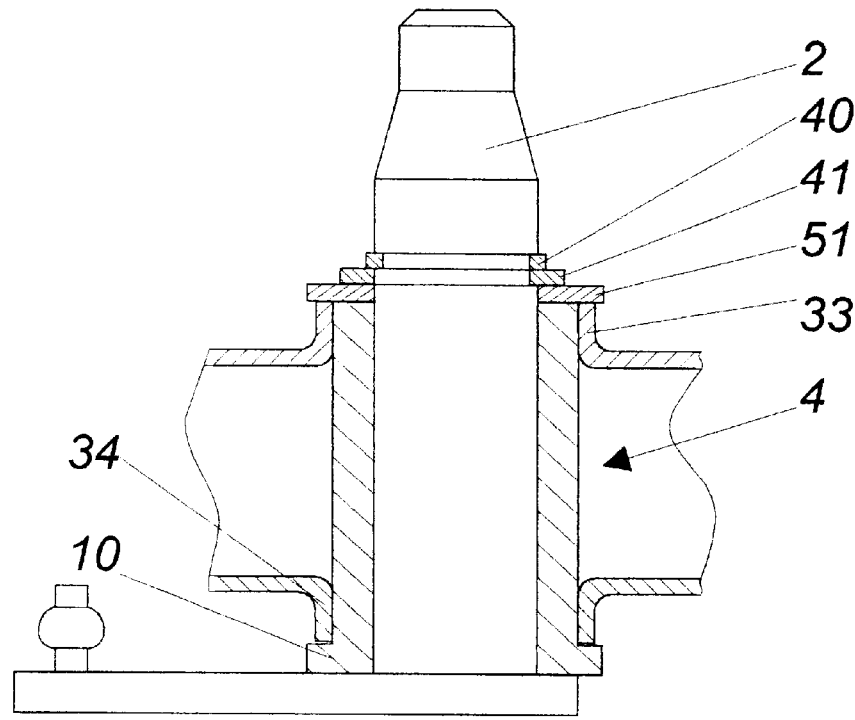
FIG. 10 is a view showing a bearing bushing with a supporting ring in accordance with the present invention.

FIG. 10 shows a one-part bearing bushing 4. The bearing bushing 4 has a lower collar 10 and is inserted from below into the tubular element 3 so that the collar 10 comes to abutment with the end side of the lower flange 4. At the upper side, the bearing bushing 4 ends with or is located slightly below the end side of the upper flange 33. The driven shaft is supported through a safety ring 40, a running-on ring 41 and through a bearing ring 51 against the end side of the upper flange 33. The bearing ring 51 is arrested on the end side of the upper flange 33 so that the relative movement is provided between the running-on ring 41 and the bearing ring 51.

Figure 11:
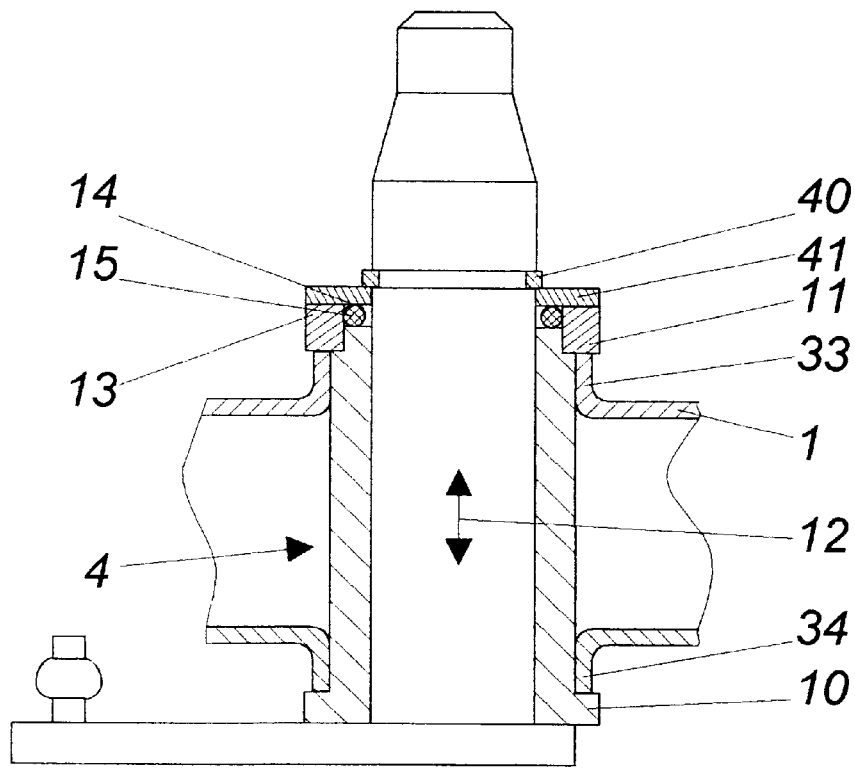
FIG. 11 is a view showing a bearing bushing with a bearing ring fitted on it in accordance with the present invention.
Figure 12:
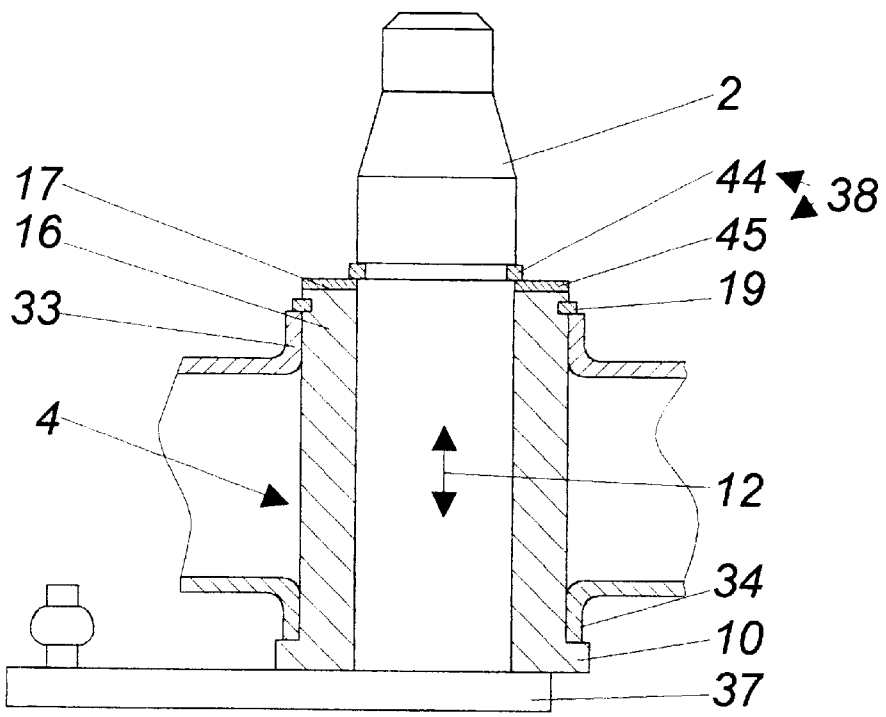
FIG. 12 is a view showing a bearing bushing formed with a wall formed as a running-on surface with a safety ring in accordance with the present invention.

A further one-part bearing bushing 4 with a bearing ring 11 is shown in FIG. 11. The bearing bushing 4 is inserted from below in the tubular element 3 and fixed in the axial direction 12 upwardly by a lower collar 10. The collar 10 comes to abutment with the end side of the lower flange 34 in a form-locking manner. The bearing bushing 4 extends upwardly over the flange 33. The bearing ring 11 is screwed or fitted on the projecting part and comes to abutment with the end side of the upper flange 33 in a form-locking manner. The bearing ring 11 extends also in the axial direction 12 outwardly beyond the bearing bushing 4 and forms with a projecting part 13 of the driven shaft 2 a structural space 14 for a seal 15. The driven shaft 2 is supported in the axial direction 12 from below upwardly against the collar 10 and from above downwardly through a safety ring 40 and a running ring 41 against the bearing ring 11. The bearing ring comes to abutment with the end side of the flange 33 in a form-locking manner. The bearing bushing 4 in FIG. 12 has a wall 16 which is used as a running-on surface 17. The bearing bushing 4 is pre-mounted on the driven shaft 2 with rings 18, a safety ring 44 and a running-on ring 45 and is inserted as a structural group with the driven shaft 2 into the tubular element 3. In the axial direction 12 from above downwardly, the driven shaft 2 abuts through a web 37, against a collar 10 of the bearing bushing 4. The bearing bushing abuts against the end side of the lower flange 34 of the tubular element 3. In the axial direction 3 from above downwardly, the bearing bushing 4 is fixed by a safety ring 19. The driven shaft 2 is supported at the axial direction 12 from above downwardly against the running-on surface 17 of the bearing bushing 4 through the safety ring 44 and the running-on ring 45.

Figure 13:
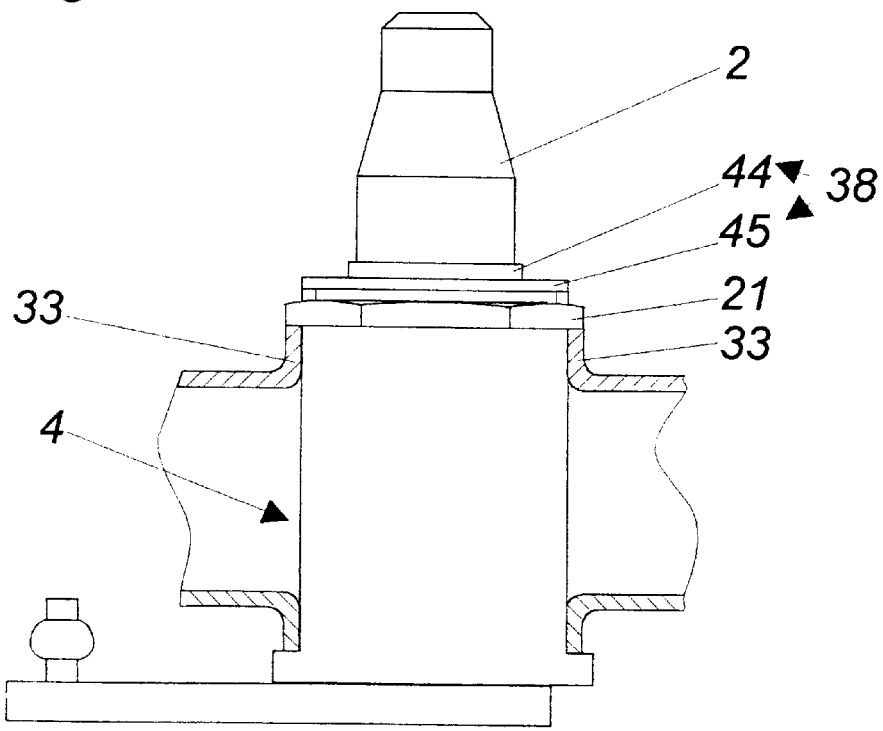
FIG. 13 is a view showing a bearing bushing with a wall used as a running-on surface and with a swivel nut.

The safety ring 19 fixes axially the bearing bushing 4. The safety ring can be replaced by a swivel nut 21 as shown for example in FIG. 13.

Figure 14:
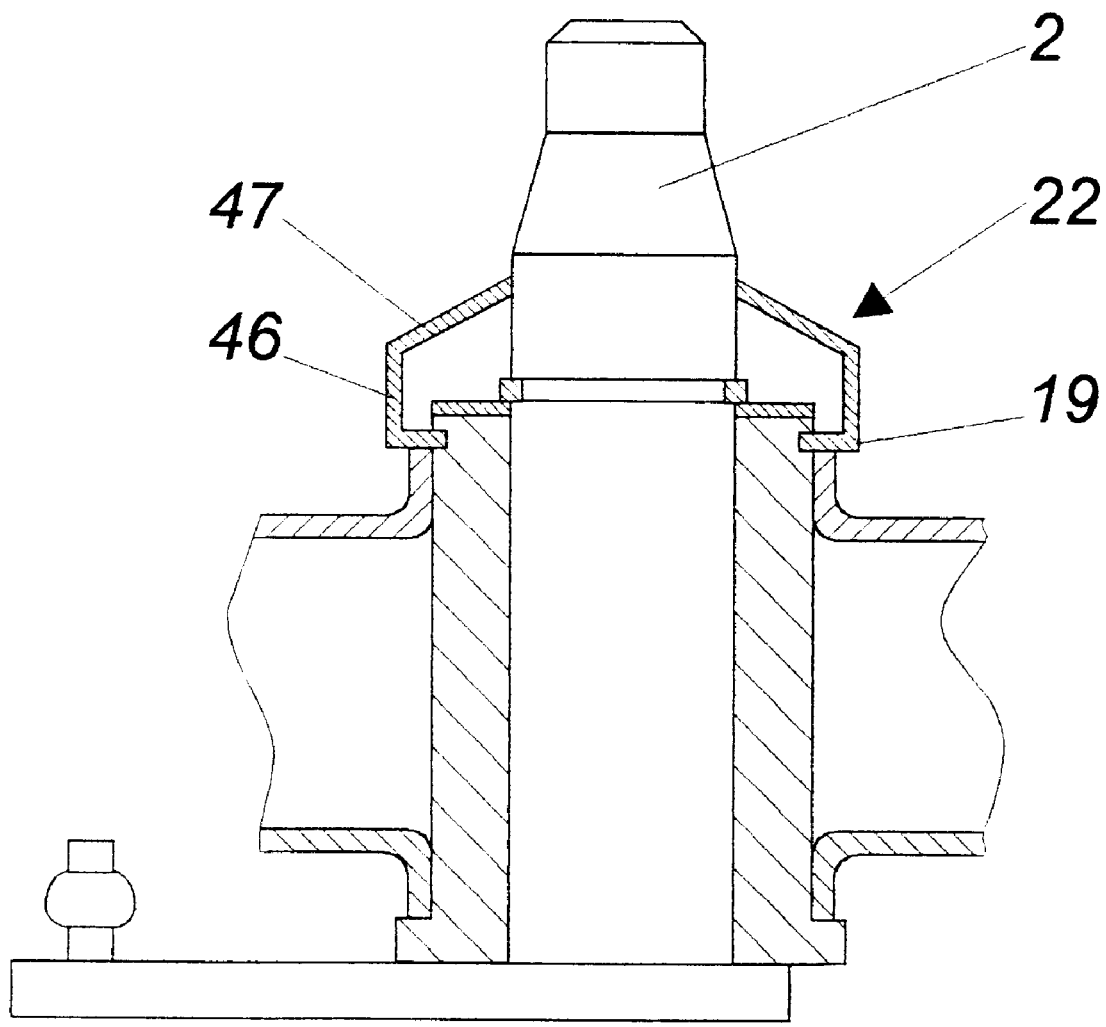
FIG. 14 is a view showing a bearing bushing with a safety ring which is designed additionally as a protective cap in accordance with the present invention.

In accordance with the present invention, the safety ring 19 or the swivel nut 21 can be designed as a protective cap 20 as shown in FIG. 14. It screens the upper region of the bearing with an axial part 46 and the radial part 47.

Figure 15:
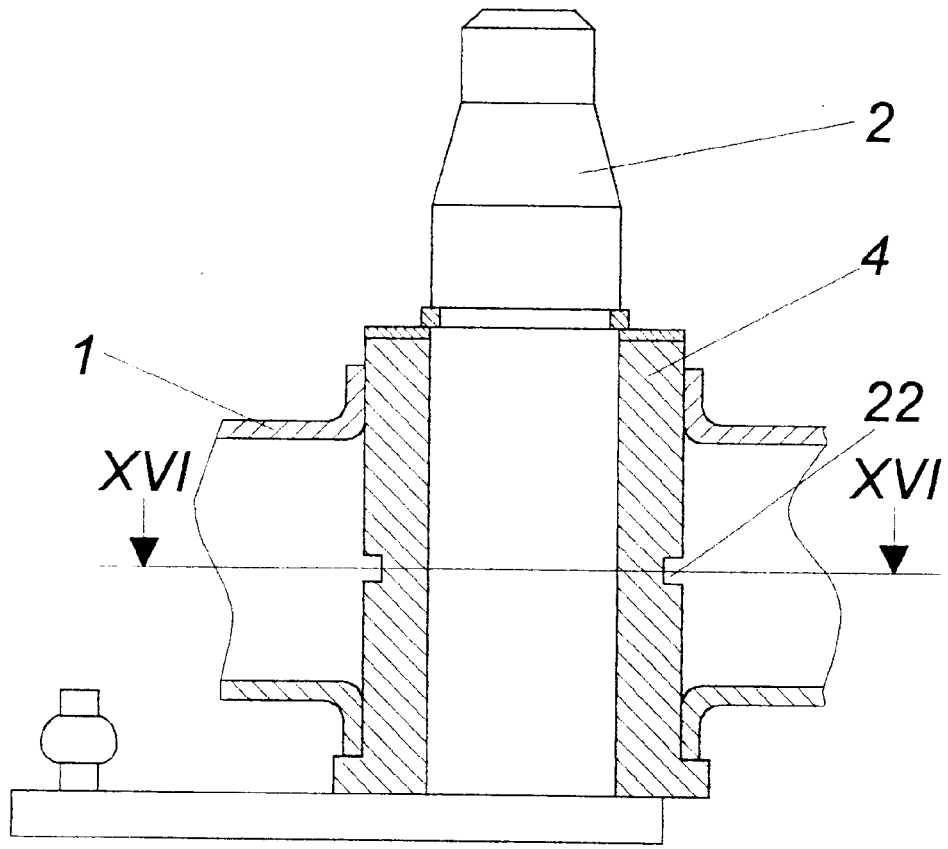
FIG. 15 is a view showing a bearing bushing with a nut on its periphery, in which a tubular element is pressed in accordance with the present invention.
Figure 16:
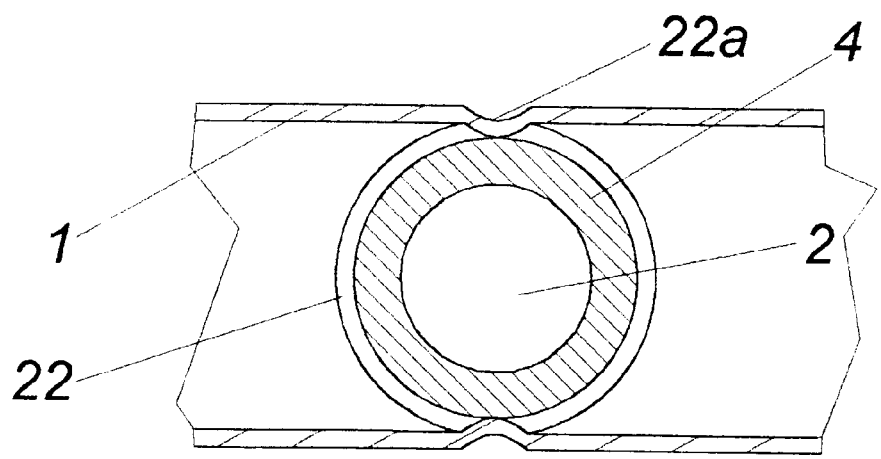
FIG. 16 is a view showing a section taken along the line XVI—XVI in FIG. 15.

A further variant for fixing the bearing bushing 4 and thereby the structural group in the axial direction 12 from above downwardly is provided when the tubular element 3 is punched into available depressions 22 in the bearing bushing 4, for example a groove 22a. This is performed for example 90° to the longitudinal direction of the tubular plate 1 as shown in FIGS. 15 and 16.

Figure 17:
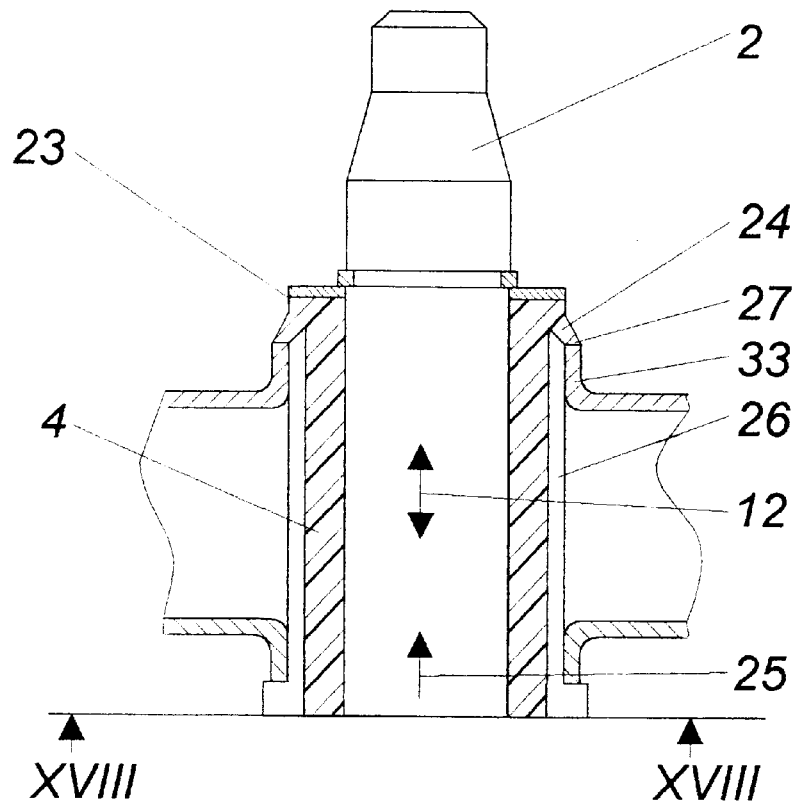
FIG. 17 is a view showing a bearing bushing with a spring tongue on its periphery in accordance with the present invention.
Figure 18:
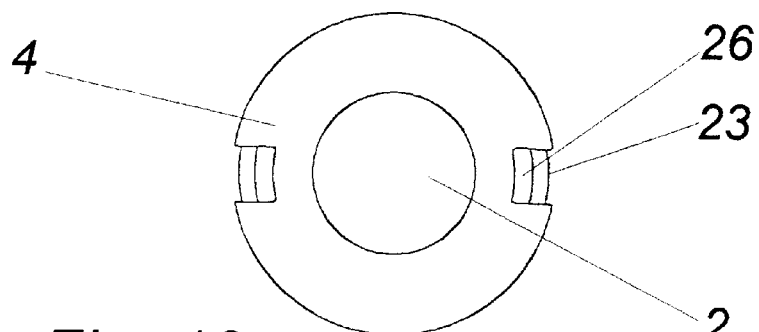
FIG. 18 is a view as seen along the line XVIII—XVIII in FIG. 17.
Figure 19:
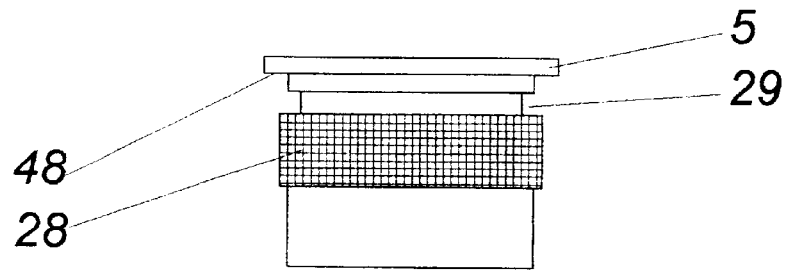
FIG. 19 is a bearing bushing provided with knurling on its periphery, which is limited toward the collar by a groove in accordance with the present invention.

In accordance with the embodiment of the present invention, a spring tongue 24 which extends outwardly beyond the outer contour 23 of the bearing bushing 4 can fix the bearing bushing 4 in the axial direction 12 from above downwardly. The spring tongue 24 is oriented opposite to the mounting direction 25. It is pressed during the mounting into a free space 26 and engages in the end position of the mounting behind an axial abutment surface 27. The abutment surface 27 is formed for example by the end side of the upper collar 33 of the tubular element 3 as shown in FIGS. 17 and 18.

A relatively good force-transmitting connection in accordance with the present invention despite small supporting surfaces is obtained when the bearing bushing 4 at least over its periphery has a region of a deformable material. This region is limited toward the collar 5 by a ring-shaped depression.

FIG. 9 shows a preferable embodiment in which the bearing bushing 4 is composed of synthetic plastic material and provided with a longitudinal knurl 28 on its periphery. The longitudinal knurl is limited by a groove 29 toward the collar 5. When the bearing bushing 4 is inserted into the tubular element 3, the peeled material is accumulated in the groove 29. The collars 5 or 10 are located with the inwardly facing side 48 closely on the end side of the upper or lower flange 33, 34 of the tubular element 3.

Figure 20:
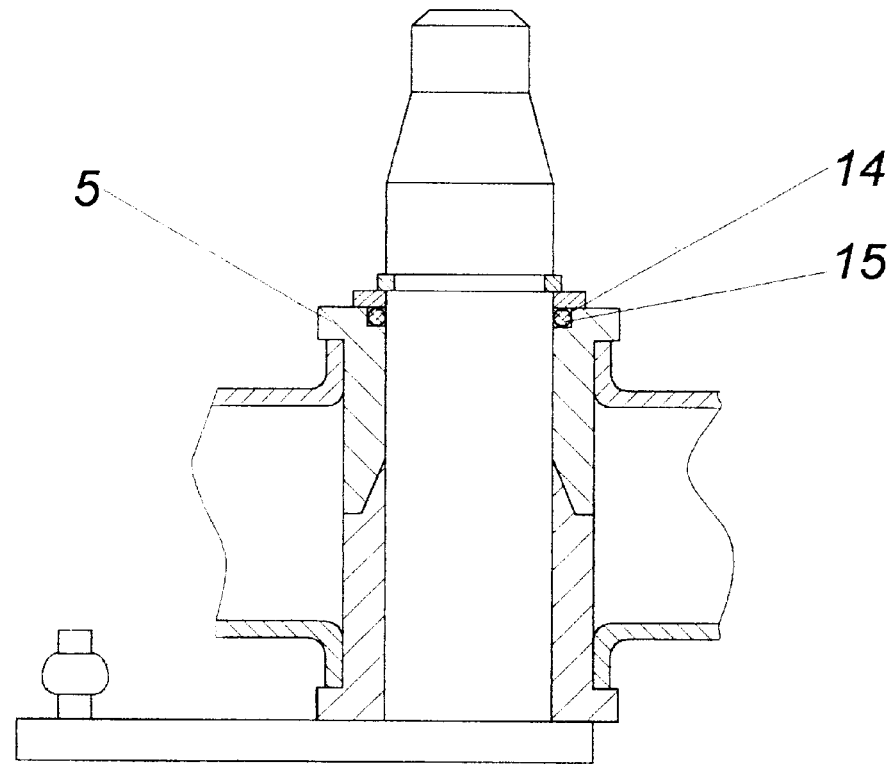
FIG. 20 is a bearing bushing with a structural space or a seal integrated in a collar in accordance with the present invention.
Figure 21:
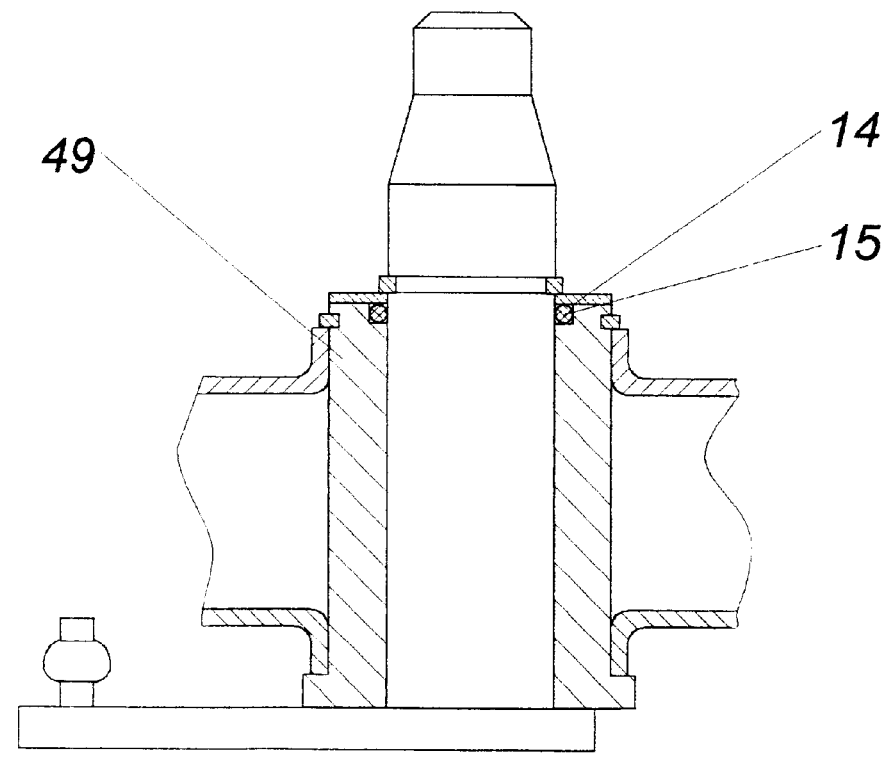
FIG. 21 is a bearing bushing in which a structural space for a seal is integrated in a wall in accordance with the present invention.

FIGS. 20 and 21 illustrate bearing bushings 4 with integrated structural spaces 14 for seals 15. Thereby a compact and grease-tight bearing is obtained. In FIG. 20 the structural space is integrated in the collar 5, while in FIG. 21 it is integrated in the wall 49 of the bearing bushing 4.

Figure 22:
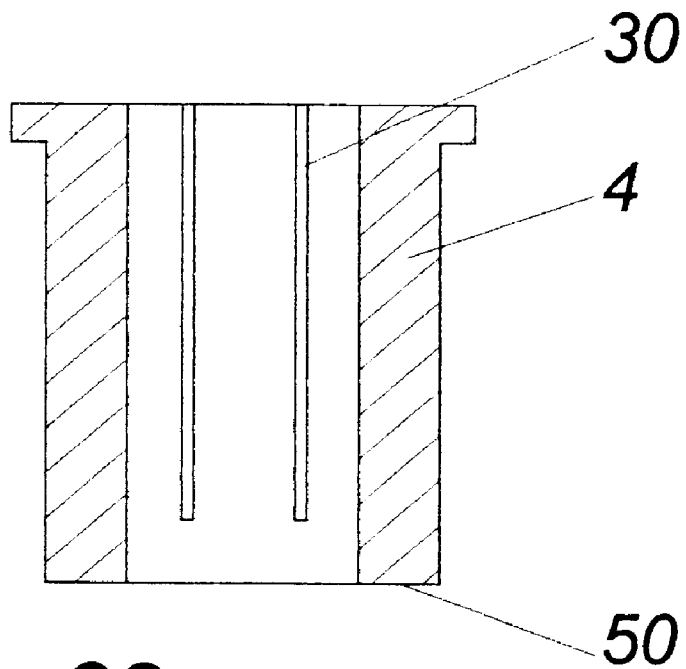
FIG. 22 is a view showing a bearing bushing with lubricating grooves in accordance with the present invention.
Figure 23:
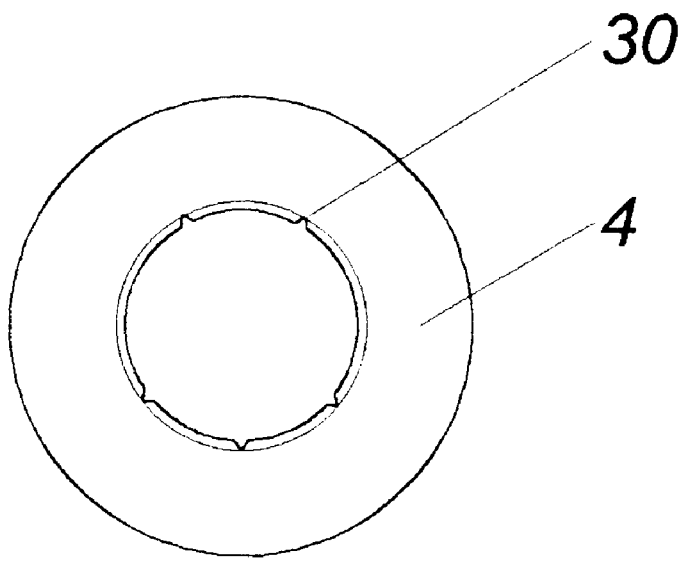
FIG. 23 is a plan view of a bearing bushing with lubricating grooves in accordance with the present invention.

In accordance with an embodiment of the present invention, the bearing bushing is provided in the axial direction 12 from above downwardly with the lubricating grooves 30 or lubricating pockets 30. They are preferably distributed uniformly over the periphery, for example five times. They can be formed as throughgoing formations or can end above the lower edge 50 of the bearing bushing 4. Lubricant is introduced in the lubricating grooves or pockets and therefore the outer surface of the driven shaft 2 is supplied with lubricant over a long time. In this way with a simple construction a good lubrication of the bearing is obtained as clearly shown in FIGS. 22 and 23.

It will be understood that each of the elements described above, or two or more together, may also find a useful application in other types of constructions differing from the types described above.

While the invention has been illustrated and described as embodied in bearing for driven shafts of wiper device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wiper device, comprising a tube member being connectable with a chassis of a motor vehicle and being able to receive a wiper drive; a tubular element provided in said tube member for supporting a driven shaft and formed of one piece with said tube member, said driven shaft being connectable with said wiper drive and with a wiper; a bearing bushing which is arranged inside said tubular element and between said tubular element and said driven shaft, said bearing bushing and said tubular element being fixed with one another in a form-locking manner.

2. A wiper device as defined in claim 1, wherein said bearing bushing has at least one collar formed of one piece with said tube member.

3. A wiper device as defined in claim 1, wherein said tubular element has an inner contour which deviates from a circular shape and selected from the group consisting of a polygonal contour and an non-round contour, said bearing bushing having an outer contour corresponding to said inner contour.

4. A wiper device as defined in claim 3, wherein said inner and outer contours are conical as considered in an axial direction.

5. A wiper device as defined in claim 3, wherein said inner and outer contours are stepped in an axial direction.

6. A wiper device as defined in claim 1, wherein said bearing bushing is subdivided into at least two parts in a transverse direction.

7. A wiper device as defined in claim 6, wherein said parts of said bearing bushing are joined with one another in an overlapping manner.

8. A wiper device as defined in claim 6, wherein said parts of said bearing bushing are connected with one another by an arresting connection.

9. A wiper device as defined in claim 1, and further comprising a bearing ring arranged on said bearing bushing.

10. A wiper device as defined in claim 9, wherein said bearing ring extends outwardly beyond said bearing bushing in an axial direction and has a part projecting toward the driven shaft and forming a structural space; and further comprising a seal arranged said structural space.

11. A wiper device as defined in claim 1, wherein said bearing bushing has a wall which is formed as a running-on surface.

12. A wiper device as defined in claim 1, wherein said bearing bushing is mountable on the driven shaft as a structural group which is jointly insertable into said tubular element.

13. A wiper device as defined in claim 1, and further comprising a safety ring which holds axially said bearing bushing in said tubular element.

14. A wiper device as defined in claim 13, wherein said safety ring is formed as a protective cap.

15. A wiper device as defined in claim 13, wherein said safety ring is formed as a swivel nut.

16. A wiper device as defined in claim 1, wherein said bearing bushing has at least one depression provided on its periphery, said tubular element being pressed in said depression.

17. A wiper device as defined in claim 1, wherein said bearing bushing has a spring tongue extending over an outer contour of said bearing bushing and oriented opposite to a mounting direction, said spring tongue during mounting being pressable into a free space and at an end of the mounting engages an axial abutment surface.

18. A wiper device as defined in claim 17, wherein said spring tongue is formed on said bearing bushing jointly during a manufacture of said bearing bushing.

19. A wiper device as defined in claim 1, wherein said tubular element is formed as a mandrel-calibrated tubular element.

20. A wiper device as defined in claim 1, wherein said bearing bushing has at least one collar and is provided on its periphery with a region of a deformable material which is limited toward said collar by a ring-shaped depression.

21. A wiper device as defined in claim 1, wherein said bearing bushing has an integrated structural space; and further comprising a seal inserted in said integrated structural space.

22. A wiper device as defined in claim 1, wherein said bearing bushing is provided with lubricating grooves.

23. A wiper device as defined in claim 1, wherein said tube member extends in a longitudinal direction and has two ends which are spaced from one another in said longitudinal direction, said tubular element extending in a transverse direction which is substantially perpendicular to said longitudinal direction and located between said ends of said tube member.

* * * * *